3,297,699
5-NITROTHIAZOLYL-DIOXO-DIAZACYCLO-
ALKANES
Paul Schmidt, Therwil, Max Wilhelm, Allschwil, and
Kurt Eichenberger and Ernst Sury, Basel, Switzerland,
assignors to Ciba Corporation, New York, N.Y., a corporation of Delaware
No Drawing. Filed Apr. 20, 1965, Ser. No. 449,606
Claims priority, application Switzerland, Apr. 24, 1964,
5,396/64; Mar. 3, 1965, 2,950/65; Mar. 31, 1965,
4,424/65
24 Claims. (Cl. 260—256.5)

The present invention provides new 5-nitrothiazolyl-oxo-diazacycloalkanes. Especially it concerns 2,4-dioxo-1,3-diazacycloalkanes of the formula

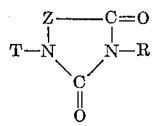

in which T represents a 5-nitrothiazolyl-2 residue; Z stands for a lower alkylene radical which separates the carbonyl group from the nitrogen atom by at most 4, preferably by 1 to 3, carbon atoms and which may be substituted by one or several, if desired substituted, hydrocarbon residues, and R represents a hydrogen atom or an unsubstituted or substituted hydrocarbon residue of aliphatic character, above all a lower alkyl radical which may be unsubstituted or substituted by a hydroxyl group or by a free or substituted amino group; or a lower alkenyl or an araliphatic residue and their salts.

Particularly suitable as hydrocarbons residues are lower alkyl, phenyl and phenyl-lower alkyl radicals such as benzyl- or phenylethyl residues. These phenyl or phenyl-lower alkyl groups may be substituted, especially by lower alkyl groups, lower alkoxy groups such as methoxy, ethoxy, propoxy or butoxy groups, or halogen atoms such as chlorine or bromine, trifluoromethyl groups or nitro groups.

In the foregoing and following lower alkyl radicals are preferably those which contain up to 5 carbon atoms, such as methyl, ethyl, propyl, isopropyl, butyl, isobutyl or pentyl groups. Lower alkenyl residues are above all allyl or methallyl residues. As araliphatic residues there may be mentioned above all phenyl-lower alkyl groups, such as benzyl, 1-phenylethyl or 2-phenylethyl residues.

Substituted amino groups are monosubstituted or preferably disubstituted amino groups, and the substituents may be above all lower alkyl, lower alkenyl, lower cycloalkyl radicals, or alkylene, mono-oxa- or monoaza-alkylene residues having from 4 to 8 carbon atoms. There may be mentioned for example, mono- or di-lower alkylamino groups such as methylamino, ethylamino, dimethylamino, diethylamino, dipropylamino, cyclohexylamino, diallylamino or methallylamino groups, pyrrolidino, piperidino, morpholino, hexa- or hepta-methyleneamino, piperazino, N-lower alkylpiperazino or N-(hydroxy-lower alkyl)-piperazino groups, such as N-methyl-piperazino or N-hydroxyethyl-piperazino groups.

A substituted alkyl residue is more especially a hydroxy- or tertiary amino-methyl, -ethyl or -propyl residue.

The araliphatic residues may be substituted on the carbon atoms, especially on the aryl residues by halogen atoms such as chlorine or bromine, the pseudohalogen trifluoromethyl, lower alkyls such as methyl or ethyl, by lower alkoxy groups such as methoxy, ethoxy or methylene-dioxy or by nitro groups.

The new compounds may be further substituted, more especially in the 4-position of the thiazole ring, for example by lower aliphatic hydrocarbon residues or by aryl groups, and the aryl residues themselves may likewise be substituted, for example as indicated above. Suitable lower aliphatic hydrocarbon residues are above all lower alkyls such as methyl, ethyl, propyl, isopropyl, butyl, isobutyl or pentyl. The aryl residues are above all phenyls.

The residue Z is especially a methylene-(1,2), ethylene-(1,2), propylene-(1,3) or butylene-(1,4) residue which may be substituted as indicated, above all by lower alkyls.

The new compounds possess valuable pharmacological properties, more especially antiparasitary and antibacterial properties. They act above all against protozoae and worms and act, for example, in an infected animal, for instance mice, towards Gram-negative bacteria, e.g. *Salmonella typhi* or *coli bacilli*, such as *Escherichia coli*. As has been observed, for example in experiments on hamsters, the new compounds are particularly active against trichomonades and amoebae and, for example in mice and sheep, against schistosomae. They also act against coccidiae. The new compounds may therefore be used for combating parasites and bacteria. They are particularly suitable for treating conditions caused by the pathogens mentioned. The new compounds are also suitable for use as intermediates for the manufacture of other useful substances.

Of special value are the compounds of the formula

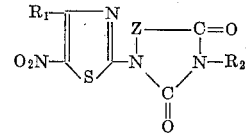

where $R_1$ is a lower alkyl radical, or especially a hydrogen atom; $R_2$ represents a lower hydroxyalkyl radical, a lower tertiary aminoalkyl group such as a di-lower alkyl amino-lower alkyl group, a piperidino-, pyrrolidino-, or morpholino-lower alkyl group, a lower alkyl radical, a phenyl-lower alkyl radical which may be substituted, for example, as indicated above, or preferably a hydrogen atom, and Z stands for a methylene-(1,2), ethylene-(1,2), propylene-(1,3) or butylene-(1,4) radical which may be substituted by lower alkyls or which is preferably unsubstituted.

Particularly valuable biological properties are found in

1-[5-nitrothiazolyl-(2)]-2,4-dioxo-imidazolidine,
1-[5-nitrothiazolyl-(2)]-2,4-dioxo - 3 - (hydroxymethyl)-imidazolidine,
1-[5-nitrothiazolyl-(2)] - 3 - (β-diethylamino-ethyl)-2,4-dioxo-imidazolidine,
1-[5-nitrothiazolyl-(2)]-2,4 - dioxo-hexahydropyrimidine and
1-[5-nitrothiazolyl-(2)] - 3 - (hydroxymethyl)-2,4-dioxo-hexahydropyrimidine.

The new compounds are manufactured by known methods.

For example, the new compounds are obtained when a compound of the formula

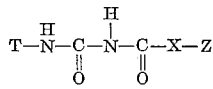

where T has the above meaning, Z is a lower alkylene radical which separates X from the carbonyl group by up to 4 carbon atoms and which may be substituted by one or several, if desired, substituted, hydrocarbon residues and X stands for a chlorine or bromine atom, is subjected to intramolecular condensation accompanied by elimination of hydrochloric or hydrobromic acid, and, if desired, in a compound so obtained, a radical R is introduced into the 3-position of the dioxo-diazacloalkane.

The intramolecular condensation (cyclisation) is preferably performed by heating, advantageously in the presence of a polar solvent, above all water, and/or in the presence of a condensing agent, especially a basic condensing agent such as an alkali metal acetate or carbontae, if desired in a suitable solvent, such as an acid amide, for example dimethylformamide.

According to another process for the manufacture of those of the new compounds in which R represents an unsubstituted hydrocarbon radical of aliphatic character, a compound of the formula

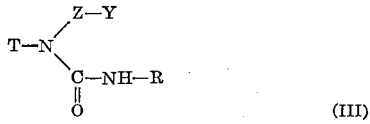

(III)

in which T has the meaning given above, R represents an unsubstituted hydrocarbon radical of aliphatic character, Z represents a lower alkylene radical which separates Y from the nitrogen atom by at most 4 carbon atoms and which may be substituted by one or more optionally substituted hydrocarbon radicals, and Y represents a lower carbalkoxy group, such as a carbethoxy or carbomethoxy group, is intramolecularly condensed.

The intramolecular condensation (ring closure) is carried out in the customary manner, advantageously by heating in a solvent and, if desired, in the presence of a condensing agent, particularly an acidic agent, such as a mineral acid, for example a hydrohalic acid or sulphuric acid.

According to another process for the manufacture of the new compounds, a compound of the formula

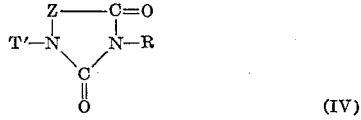

(IV)

where R and Z have the above meanings and T' is a thiazolyl-2-residue which is unsubstituted in position 5, is nitrated. Nitration is carried out in the manner known to thiazole chemistry, for example by treatment with the mixed anhydride of nitric acid and a carboxylic acid, such as acetic acid. Any phenyl groups present may be nitrated at the same time.

A particularly advantageous nitration method consists, for example in forming the nitric acid addition salt of a compound of Formula IV and treating it with an acidic agent.

The nitric acid addition salt is formed, for example, by reacting the free compound of Formula IV with a slight excess of nitric acid, advantageously in a concentrated form, in the presence of a suitable solvent, such as acetic acid.

The acidic agents used in the reaction are primarily mineral acids, particularly sulphuric acid, which is advantageously used in concentrated form.

The nitric acid addition salt is reacted advantageously at a raised temperature, preferably between 40 and 100° C., for example at 60–80° C. The desired product is isolated by a method known per se, for example by pouring the reaction mixture on to ice or ice water, and is obtained in a very pure form.

Another advantageous nitration method for the preparation of compounds, in which R represents hydrogen, consists in reacting a compound of Formula IV in which R represents hydrogen with fuming nitric acid, for example nitric acid of 96% strength, preferably in the presence of concentrated sulphuric acid and at room temperature, and treating the resulting 1-T-3-nitro compound with an acidic hydrolysing agent.

The hydrolysis of the nitro group in the 3-position is preferably carried out by treating the 1-T-3-nitro compound with a dilute acid, especially a mineral acid, such as dilute sulphuric acid, advantageously at a raised temperature, particularly at a temperature between 50 and 150° C., for example at the reflux temperature of the hydrolysing agent.

The desired product is isolated by a method known per se, for example by diluting the reaction mixture with water, or by pouring it on to ice or ice water.

The introduction of the radical R into a 3-unsubstituted compound is carried out in a manner known per se. Thus, for example compounds in which the substituent R contains no hetero atoms or in which hetero atoms present in R are separated from the cyclic nitrogen atom by at least 2 carbon atoms, can be obtained by reaction of the 3-unsubstituted compound with a reactive ester of an alcohol of the formula R—OH. Reactive esters suitable for this purpose are those with strong inorganic acids or organic sulphonic acids, above all with hydrohalic acids, for example hydrochloric, hydrobromic or hydroiodic acid, or sulphuric acid, or an arylsulphonic or alkanesulphonic acid, above all phenylsulphonic such as toluenesulphonic acids. If desired, this operation is performed with a metal salt such as an alkali metal salt of the 3-unsubstituted 2,4-dioxo-1,3-diaza-cycloalkane, or in the presence of a basic condensing agent, especially a condensing agent capable of forming metal salts, such as an amide, hydride, hydrocarbon compound; hydroxide, alcoholate or carbonate of an alkali metal. Alternatively, the residue R of the kind referred to may be introduced by treatment with a diazo compound of the formula

 R'=N≡N where R' corresponds to the alcohol residue R except for the double bond towards the nitrogen concerned.

Compounds in which R is a methyl residue that carries a hydroxyl group or a free or substituted amino group, especially a hydroxymethyl, or secondary or tertiary aminomethyl residue, are obtained by reaction with formaldehyde, if desired in the presence of ammonia or of an amine.

Introduction of the hydroxymethyl group is achieved by a simple reaction with formaldehyde, if desired in the form of a formaldehyde donor, such as trioxymethylene or paraformaldehyde, advantageously in the presence of a basic condensing agent, such as an alkali metal hydroxide or carbonate, or of a tertiary amine or quaternary ammonium hydroxide, such as triethylamine or benzyltrimethyl ammonium hydroxide.

The aminomethyl group is advantageously introduced by the Mannich reaction, for example with formaldehyde, with the use of a salt of ammonia or of an amine. Also in this case the formaldehyde may be used in the form of a donor, such as trioxymethylene or paraformaldehyde, if desired in the presence of an acid.

The above-mentioned reactions are performed in the usual manner, in the presence or absence of diluents, condensing agents and/or catalysts, at room temperature or with heating or cooling, under atmospheric or superatmospheric pressure and/or in an inert gas.

Depending on the reaction conditions and starting materials used, the final products are obtained in the free form or in the form of their salts which are likewise included in the present invention. A resulting amine can be converted into a salt thereof in the usual manner by reaction with an organic or inorganic acid, especially one that is suitable for the formation of therapeutically useful salts. On the other hand, a resulting salt can be converted into the free compound in the usual manner, for example, by treatment with a basic agent or ion exchange resin. Acids, suitable for the formation of therapeutically useful salts, are for instance hydrohalic, sulphuric or phosphoric acids, nitric or perchloric acid; alicylic, aromatic or heterocyclic carboxylic or sulphuric acids such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, parahydroxybenzoic, salicylic, para-aminosalicylic or embonic acid, methanesulphonic, ethanesulphonic, hydroxyethanesulphonic, ethylenesulphonic acid, halogenbenzenesulphonic, toluenesulphonic, naphthalenesulphonic acids or sulphanilic acid; methionine, tryptophan, lysine or arginine.

These or other salts of the new compounds, for instance their picrates, may also be used for purifying the resulting bases, by converting the latter into salts, isolating the salts and liberating the bases again from them. In view of the close relationship between the new compounds in the free form and in the form of their salts, what has been said above and below concerning the free compounds applies also to the corresponding salts wherever this is possible and suitable.

The invention includes also any modification of the present process in which an intermediate obtainable at any stage of the process is used as starting materials and any remaining step/steps is/are carried out, or in which the starting materials are formed under the reaction conditions or are used in the form of their salts, as well as the new starting materials.

It is advantageous to use starting materials that give rise to the final products described above as being particularly valuable.

The starting materials used are known or, insofar as they are new, they can be prepared by known methods.

The new compounds are suitable for use as medicaments, for example in the form of pharmaceutical preparations which contain them in the free form or, as the case may be, in the form of their physiologically tolerable salts in conjunction or admixture with an organic or inorganic, solid or liquid pharmaceutical excipient suitable for enteral, parenteral or local administration. Suitable excipients are substances that do not react with the new compounds, for example water, gelatine, lactose, starches, magnesium stearate, talcum, vegetable oils, benzyl alcohols, gums, polyalkyleneglycols, white petroleum jelly, cholesterol or other known medicinal excipients. The pharmaceutical preparations may be, for example, tablets, dragees, ointments or creams, or in liquid form solutions, suspensions or emulsions. They may be sterilised and/or contain assistants such as preserving, stabilising, wetting or emulsifying agents, salts for regulating the osmotic pressure, or buffers. They may also contain further therapeutically valuable substances.

The above-mentioned products may also be used in conjunction with conventional animal fodders or vehicles as fodders or additives to fodders in animal husbandry.

Some of the N-(ω-halogenalkanoyl)-N'-[5-nitrothiazolyl-(2)]-ureas to be used as starting materials are new. Those which are new are likewise included in this invention. They possess antiparasitary properties, for example against the parasites referred to above, and can be suitably used.

The following examples illustrate the invention.

*Example 1*

10.0 g. of N-[5-nitrothiazolyl-(2)]-N'-(chloracetyl)-urea are added to a solution of 5.0 g. of sodium acetate in 200 ml. of water. The whole is stirred and heated to 80° C. within 3 hours and then neutralised with 2 N-hydrochloric acid. The precipitate formed is filtered off and recrystallised from aqueous dimethylformamide, to yield crystalline 1-[5-nitrothiazolyl-(2)]-2,4-dioxo-imidazolidine of the formula

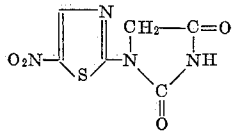

melting at 240–242° C.

The N-[5-nitrothiazolyl-(2)]-N'-(chloracetyl)-urea used as starting materials is prepared thus:

36 g. of chloracetyl isocyanate are stirred dropwise at 50° C. into a solution of 47 g. of 2-amino-5-nitrothiazole in 270 ml. of absolute tetrahydrofuran. The batch is stirred for 1 hour at 50° C. and then cooled to room temperature. On addition of water a yellow precipitate forms which is filtered off and rinsed with warm alcohol. The resulting N-[5-nitrothiazolyl-(2)]-N'-(chloracetyl)-urea melts at 218–220° C.

*Example 2*

A solution of 1 g. of diazomethane in 20 ml. of ether is added to a solution of 5.0 g. of 1-[5-nitrothiazolyl-(2)]-2,4-dioxo-imidazolidine in 100 ml. of absolute tetrahydrofuran, and the whole is allowed to stand for 4 hours at room temperature, then evaporated in vacuo, the residue recrystallized from dimethylformamide+water to yield 1-[5-nitrothiazolyl-(2)]3-methyl-2,4-dioxo-imidazolidine of the formula

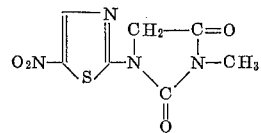

in the form of crystals melting at 230–232° C.

*Example 3*

24 g. of N-[5-nitro-thiazolyl-(2)]-N-carbethoxymethyl-N'-(n-butyl)-urea are boiled with reflux in 120 ml. of alcoholic hydrochloric acid for 2 hours. The hot solution is then filtered, concentrated and the resulting crystallisate isolated to yield 1-[5-nitrothiazolyl-(2)]-3-(n-butyl)-2,4-dioxo-imidazolidine of the formula

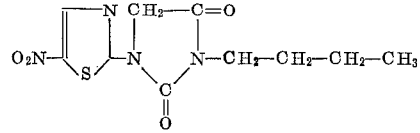

melting at 128–130° C.

The N-[5-nitrothiazolyl-(2)]-N-carbethoxy-methyl-N'-(n-butyl)urea used as starting material can be obtained by condensing 44 g. of N-[5-nitrothiazolyl-(2)]-N'-(n-butyl)-urea (prepared from 2-amino-5-nitrothiazole and n-butyl-isocyanate in acetone) with 33 g. of bromacetic acid ethyl ester in absolute dioxan in the presence of 8.8 g. of sodium hydride in oil (50% strength). The product melts at 143–145° C.

*Example 4*

20 ml. of 2 N sodium hydroxide solution are added dropwise at 60° C. with stirring to a suspension of 6.4 g. of N-[5-nitrothiazolyl-(2)]-N'-(β-bromopropionyl)-urea. After 30 minutes the reaction mixture is cooled to room temperature and the pH value is adjusted to 6 by the addition of 2 N hydrochloric acid. A precipitate settles out which is recrystallized from dimethyl-formamide+ethanol. 1-[5-nitrothiazolyl-(2)]-2,4-dioxo-hexahydropyrimidine of the formula

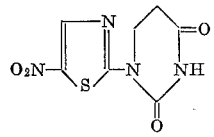

is obtained in the form of yellow crystals melting at 278–279° C.

The N-[5-nitrothiazolyl-(2)]-N'-(β-bromopropionyl)-urea used as starting material may be obtained as follows (cf. H. W. Johnson et al., J.A.C.S. 80, 3150 (1958)):

A suspension of 18 g. of N-bromosuccinimide, 9 ml. of allyl chloride and 100 g. of benzoyl peroxide in 180 ml. of chlorofrom is boiled for 30 minutes with stirring. The reaction mixture is then cooled to room temperature and a solution of 13 g. of 2-amino-5-nitrothiazole in 100 ml. of absolute tetrahydrofuran is dropped in. A precipitate settles out which is recrystallised from alcohol to yield N-[5-nitrothiazolyl-(2)]-N'-(β-bromopropionyl)-urea in the form of crystals melting at 168° C.

Example 5

The new compounds may be used in the form of pharmaceutical preparations, the daily dose varying from 0.1 to 10 mg. per kg. bodyweight. They may be administered, for example, in the form of capsules containing the desired amount of the active compound, above all 1-[5-nitrothiazolyl-(2)]-2,4-dioxo-imidazolidine.

For use as additives to animal fodder, for example chickenfeed, the new compounds, especially 1-[5-nitrothiazolyl-(2)]-2,4-dioxo-imidazolidine, can be mixed for example with cerelose (content of active compound, for example 0.1 to 1%, preferably 0.5%). This preliminary mix can then be added in the usual manner to fodder, advantageously so that the final mixture contains about 0.01% of the imidazole derivative.

Example 6

Tablets containing 500 mg. of 1-[5-nitrothiazolyl-(2)]-2,4-dioxo-imidazolidine may be prepared from the following ingredients:

| | Per tablet, mg. |
|---|---|
| 1-[5-nitrothiazolyl-(2)]-2,4-dioxo-imidazolidine | 500.0 |
| Wheat starch | 40.0 |
| Colloidal silicic acid with hydrolyses starch | 30.0 |
| Arrowroot | 30.0 |
| Magnesium stearate | 6.0 |
| Talc | 19.0 |
| | 625.0 |

*Method.*—Half of the wheat starch is pasted on a water-bath with four times the quantity of water. 1-[5-nitrothiazolyl-(2)]-2,4-dioxo-imidazolidine is homogeneously mixed with the paste is kneaded in and as much water as is required to form a plastic mass. The colloidal silicic acid with hydrolysed starch are worked-in in portions.

The plastic mass is passed through a sieve having a mesh of 4–5 mm. and dried at 45° C. The dried granulate is passed through a sieve having a mesh of 0.8–1.4 mm. and the remaining disintegrating agent and lubricant are added. After further homogenisation, tablets having a diameter of 11.5 mm. and weighing 625 mg. are compressed in the usual manner.

Example 7

In a manner analogous to that described in Example 3, it is possible to obtain from N-[5-nitrothiazolyl-(2)]-N-carbethoxymethyl-N'-ethyl urea the 1-[5-nitrothiazolyl-(2)]-3-ethyl-2,4-dioxo-imidazolidine of the formula

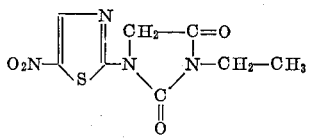

Example 8

2.2 g. of 1-[5-nitrothiazolyl-(2)]-2,4-dioxo-imidazolidine are reacted at 100° C. for 2 hours with 0.3 g. of paraformaldehyde and 0.8 g. of dimethylamine hydrochloride in 20 ml. of dimethyl formamide. On addition of ether, the 1-[5-nitrothiazolyl-(2]-2,4-dioxo-3-(dimethylaminomethyl)-imidazolidine hydrochloride of the formula

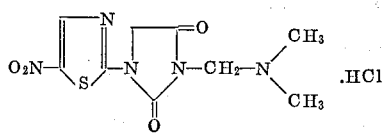

precipitates. It is recrystallized from dilute hydrochloric acid to obtain the hydrate which melts and decomposes at 208–209° C.

Example 9

In an analogous manner to that described in the respective foregoing examples, the following compounds may be prepared:

1-[4-methyl - 5 - nitrothiazolyl-(2)] - 3 - methylallyl-2,4-dioxo-1,3-diaza-cyclooctane, 1-[4-(p-nitrophenyl) - 5 - nitrothiazolyl-(2)]-3-(meta-methoxybenzyl)-2,4-dioxo-6-methyl - 1,3 - diaza-cycloheptane, 1-[5-nitrothiazolyl-(2)] - 3 - (p - nitrobenzyl)-5-benzyl-2,4-dioxo-hexahydropyrimidine, 1-[5-nitrothiazolyl) - (2)] - 3 - (morpholinomethyl)-2,4-dioxo-hexahydropyrimidine, 1-[5-nitrothiazolyl - (2)] - 3 - (heptamethyleneimino-methyl)-2,4-dioxo-5-ethyl-imidazolidine, 1-[5-nitrothiazolyl - (2)] - 3 - (allyl-cyclohexylamino-methyl)-2,4-dioxo-imidazolidine.

What is claimed is:

1. A compound of the formula

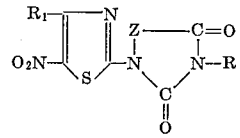

in which $R_1$ stands for a member selected from the group consisting of hydrogen, lower alkyl, lower alkenyl, phenyl, lower alkyl-phenyl, lower alkoxy-phenyl, halogeno-phenyl, trifluoromethylphenyl and nitrophenyl, Z stands for a member selected from the group consisting of lower alkylene separating the carbonyl group from the nitrogen atom by at most 4 carbon atoms and lower alkylene separating the carbonyl group from the nitrogen atom by at most 4 carbon atoms and substituted by at least one member selected from the group consisting of lower alkyl, phenyl, lower alkylphenyl, lower alkoxyphenyl, halogeno-phenyl, trifluoromethylphenyl, nitrophenyl, phenyl-lower alkyl, lower alkyl-phenyl-lower alkyl, lower alkoxy-phenyl-lower alkyl, halogeno-phenyl-lower alkyl, trifluoro-methyl-phenyl-lower alkyl and nitrophenyl-lower alkyl, R represents a member selected from the group consisting of hydrogen, lower alkyl, lower alkenyl, hydroxy-lower alkyl, phenyl-lower alkyl, lower alkyl-phenyl-lower alkyl, lower alkoxy-phenyl-lower alkyl, halogeno-phenyl-lower alkyl, trifluoromethyl-phenyl-lower alkyl and nitrophenyl-lower alkyl.

2. A compound of the formula

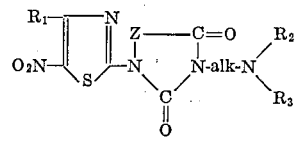

in which $R_1$ stands for a member selected from the group consisting of hydrogen, lower alkyl, lower alkenyl, phenyl, lower alkyl-phenyl, lower alkoxy-phenyl, halogeno-phenyl, trifluoromethylphenyl and nitrophenyl, Z stands for a member selected from the group consisting of lower alkylene separating the carbonyl group from the nitrogen atom by at most 4 carbon atoms and lower alkylene separating the carbonyl group from the nitrogen atom by at most 4 carbon atoms and substituted by at least one member selected from the group consisting of lower alkyl, phenyl, lower alkylphenyl, lower alkoxyphenyl, halogen-phenyl, trifluoromethylphenyl, nitrophenyl, phenyl-lower alkyl, lower alkyl-phenyl-lower alkyl, lower alkoxy-phenyl-lower alkyl, halogeno-phenyl-lower alkyl, trifluoro-methyl-phenyl-lower alkyl and nitrophenyl-lower alkyl, alk stands for lower alkylene and $R_2$ and $R_3$ each stands for a member selected from the group consisting of hydrogen, lower alkyl, lower alkenyl, lower cycloalkyl, and, when taken together, alkylene, monooxaalkylene and monoaza-alkylene having from 4 to 8 carbon atoms.

3. An acid addition salt of a compound as claimed in claim 2.

4. A compound of the formula

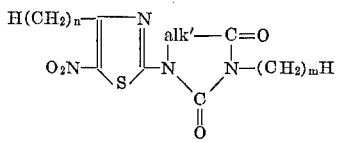

in which $n$ and $m$ each stands for an integer from 0 to 5 and alk' for lower alkylene separating the carbonyl group from the nitrogen atom by 1 to 3 carbon atoms.

5. A compound of the formula

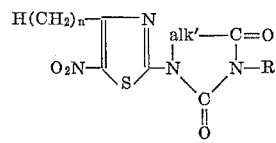

in which $n$ stands for an integer from 0 to 5, alk' for lower alkylene separating the carbonyl group from the nitrogen atom by 1 to 3 carbon atoms and R for hydroxy-lower alkyl.

6. A compound of the formula

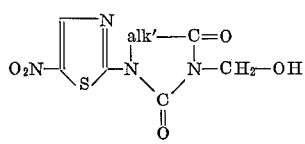

in which alk' stands for lower alkylene separating the carbonyl group from the nitrogen atom by 1 to 3 carbon atoms.

7. A compound of the formula

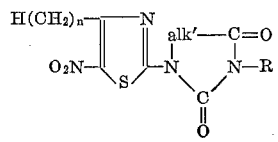

in which $n$ stands for an integer from 0 to 5, alk' for lower alkylene separating the carbonyl group from the nitrogen atom by 1 to 3 carbon atoms and R for di-lower-alkylamino-lower alkyl.

8. An acid addition salt of a compound as claimed in claim 7.

9. A compound of the formula

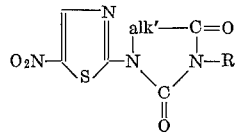

in which alk' stands for lower alkylene separating the carbonyl group from the nitrogen atom by 1 to 3 carbon atoms and R for di-lower alkylamino-methyl.

10. An acid addition salt of a compound as claimed in claim 9.

11. 1-[5-nitrothiazolyl-(2)]-2,4-dioxo-imidazolidine.

12. 1 - [5-nitrothiazolyl-(2)]-2,4-dioxo - 3 - (hydroxymethyl)-imidazolidine.

13. 1 - [5-nitrothiazolyl-(2)]-3-($\beta$-diethylamino-ethyl)-2,4-dioxo-imidazolidine.

14. An acid addition salt of a compound as claimed in claim 13.

15. 1-[5-nitrothiazolyl-(2)] - 2,4 - dioxo-hexahydropyrimidine.

16. 1-[5-nitrothiazolyl-(2)] - 3 - (hydroxymethyl)-2,4-dioxo-hexahydropyrimidine.

17. 1 - [5-nitrothiazolyl-(2)]-3-methyl-2,4-dioxo-imidazolidine.

18. 1 - [5 - nitrothiazolyl-(2)]-3-(n-butyl)-2,4-dioxo-imidazolidine.

19. 1 - [5 - nitrothiazolyl-(2)]-3-ethyl-2,4-dioxo-imidazolidine.

20. 1-[5-nitrothiazolyl-(2)]-3-(dimethylaminomethyl)-imidazolidine.

21. An acid addition salt of the compound claimed in claim 20.

22. N-[5-nitrothiazolyl-(2)]-N'-(chloracetyl)-urea.

23. N-[5-nitrothiazolyl-(2)] - N - carbethoxy-methyl-N'-(n-butyl)-urea.

24. N-[5 - nitrothiazolyl-(2)]-N-carbethoxymethyl-N'-ethyl-urea.

No reference cited.

ALEX MAZEL, *Primary Examiner.*

M. O'BRIEN, *Assistant Examiner.*

UNITED STATES PATENT OFFICE
CERTIFICATE OF CORRECTION

Patent No. 3,297,699                          January 10, 1967

Paul Schmidt et al.

It is hereby certified that error appears in the above numbered patent requiring correction and that the said Letters Patent should read as corrected below.

Column 1, line 33, for "hydrocarbons" read -- hydrocarbon --; column 2, lines 59 to 62, for the right-hand portion of the formula reading -X—Z                  read               -Z—X column 3, line 6, for "carbontae" read -- carbonate --; column 6, lines 32 to 37, the left-hand portion of the formula should appear as shown below instead of as in the patent:

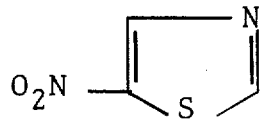

column 7, line 67, after "2", first occurrence, insert a closing parenthesis.

Signed and sealed this 7th day of November 1967.

(SEAL)
Attest:

EDWARD M. FLETCHER, JR.                        EDWARD J. BRENNER
Attesting Officer                              Commissioner of Patents